(12) United States Patent
Kowalczyk

(10) Patent No.: US 6,182,516 B1
(45) Date of Patent: Feb. 6, 2001

(54) LOW-COST, EASY-TO-USE, DYNAMOMETER

(76) Inventor: Thomas M. Kowalczyk, 15 Sycamore La., Farmington, CT (US) 06032

( * ) Notice: Under 35 U.S.C. 154(b), the term of this patent shall be extended for 0 days.

(21) Appl. No.: 09/448,202

(22) Filed: Nov. 23, 1999

(51) Int. Cl.$^7$ .................................................. G01L 3/16
(52) U.S. Cl. ............................................... 73/862.12
(58) Field of Search ........................... 73/121, 862.11, 73/862.12, 862.13, 862.14

(56) References Cited

U.S. PATENT DOCUMENTS

| | | | |
|---|---|---|---|
| 3,610,342 | * 10/1971 | Stainken | 177/147 |
| 4,412,455 | * 11/1983 | Borgersen | 73/862.12 |
| 4,685,745 | * 8/1987 | Reinecke | 303/191 |
| 4,833,938 | * 5/1989 | Reinwall et al. | 74/574 |
| 5,003,829 | * 4/1991 | DeConti et al. | 73/862.12 |

* cited by examiner

*Primary Examiner*—Max Noori
(74) *Attorney, Agent, or Firm*—M. P. Williams

(57) ABSTRACT

A disk 10 attached to the shaft 12 of an engine 6 is loaded by a disk brake 14 having hydraulic fluid under pressure applied thereto by a manual pump 35. The disk brake is mounted on a pendulum 23 which is suspended freely on a shaft 25 which is coaxial with, but independent of, the shaft of the engine. The torque loading by the brake is indicated by measuring the force which the pendulum 23 applies to a force transducer 42 or a torque meter 50. Instead of the pendulum, the disk brake may be supported on a sliding bracket 22a or a flexure 56.

11 Claims, 4 Drawing Sheets

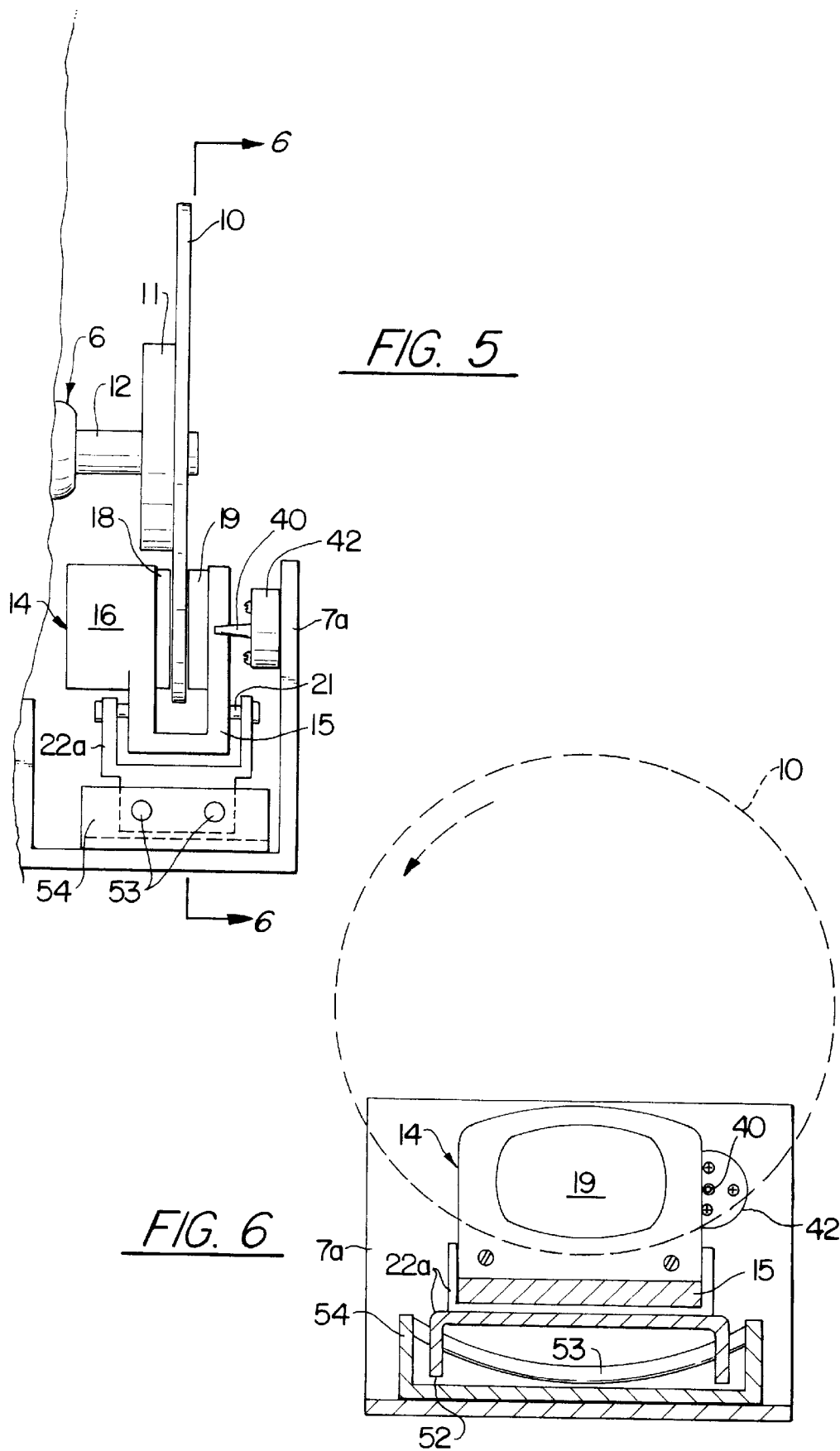

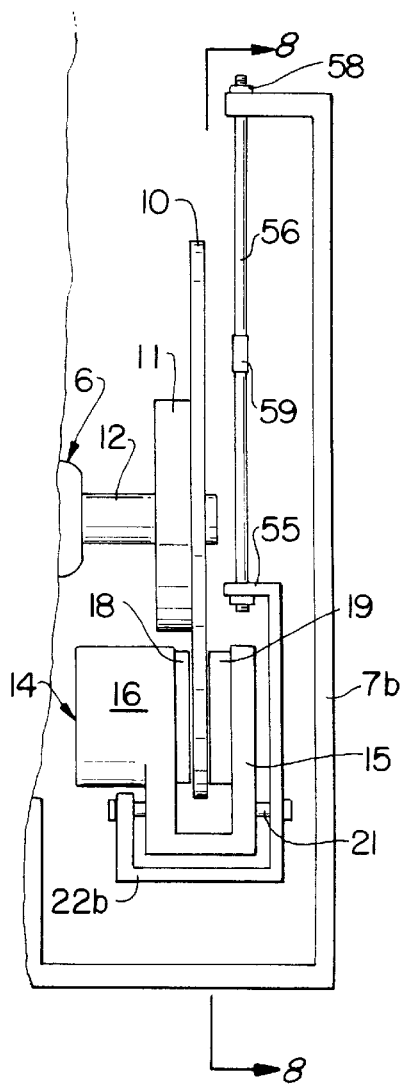
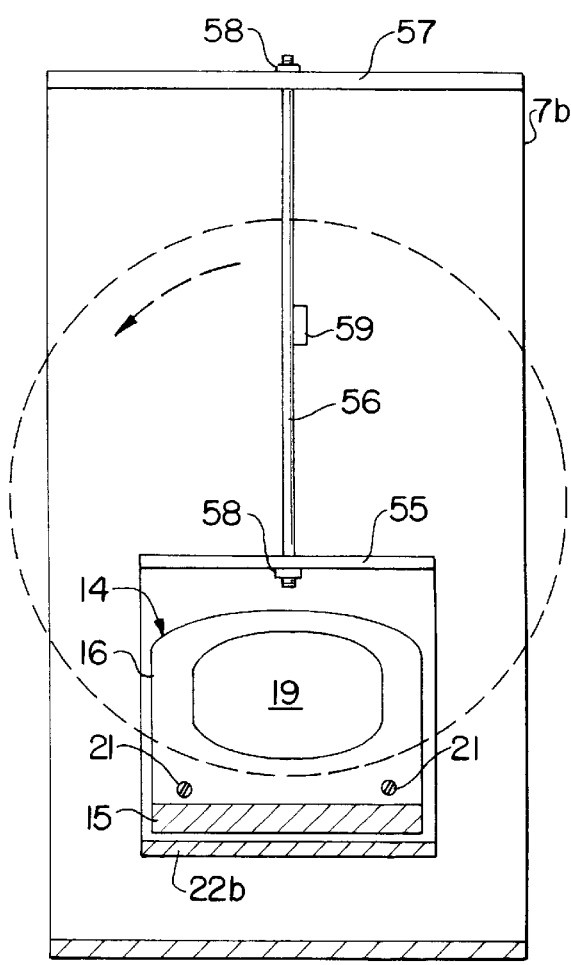
FIG. 7
FIG. 8

6,182,516 B1

LOW-COST, EASY-TO-USE, DYNAMOMETER

TECHNICAL FIELD

This invention relates to a dynamometer that measures force imparted by a disk brake to a disk attached to the shaft of an engine.

BACKGROUND ART

As is known, dynamometers are devices which load engines while running, in order to determine information about the engines, such as torque as a function of speed. Dynamometers which use dual rollers driven by wheels of a vehicle are extremely complex and expensive. Even dynamometers heretofore available for small engines, which connect an axle to the shaft of the engine independently of the vehicle, cost more than several thousand dollars.

DISCLOSURE OF INVENTION

Objects of the invention include provision of an engine dynamometer which is capable of being manufactured at very low cost, which is uncomplicated and very easy to use, and which may provide readings which are direct (e.g., a gauge) or electronic (capable of being fed directly into electronic processing apparatus, such as a personal computer).

According to the present invention, a disk mounted to a shaft driven by an engine, the torque of which is to be measured, is loaded by a disk brake mounted on a brake support. Tangential counterforce applied to the disk brake as a result of applying a braking force to the disk is measured by a force transducer, such as a conventional electronic force transducer which provides a signal proportional to force, a conventional force gauge, a distance or position measurement, or a measurement of strain. The brake support may be a pendulum which is journaled on a shaft that is coaxial with, but independent of, the motor shaft; or it may be on a pendulum journaled on the motor shaft; or it may be a member slidable in a directional coaxial with the counterforce; or it may be a flexure member, in which case, instead of a force transducer, the readout mechanism might be a position sensor or a strain gauge. In one embodiment, the disk brake comprises a caliper having disk brake pads on both sides and actuated by means of hydraulic or pneumatic pressure provided by a manual pump; clamp brakes may be used instead.

The invention may be used, as in the exemplary embodiment herein, on internal combustion engines of the type useful in racing go-carts, which may be on the order of five horsepower, or may be used in high RPM fractional horsepower motors, such as in model airplanes and remote control dune buggies and the like, or it may be used on larger engines, including quarter midget racing engines in the 20 horsepower to 30 horsepower range, or full-sized engines, provided that the brake pads and the bottom of the disk may require immersion in water or other cooling. The invention may also be used on other engines and motors, including electric motors. The precepts of the invention can be expanded utilizing much larger components for engines and motors of any sort. As used herein, the term "engine" means any type of engine or motor that produces rotary mechanical power. The invention may be utilized by being connected directly to the output shaft of an engine, as in the exemplary embodiments herein, may be connected to the output shaft of a clutch or of a transmission, may be connected to a wheel turning shaft, such as an axle, or any other shaft driven by an engine.

The disk brake may be a hydraulically actuated, caliper disk brake as disclosed in the exemplary embodiment, or it may be a clamp brake, or it may be a cam actuated brake (of the type used in early model snowmobiles) or any other form of brake which is easily controlled by the operator. It is one of the advantages of the invention that the amount of pressure applied by the brake to the disk is irrelevant; all that needs to be known is the force exerted by the brake on the disk, which is equal to the measured counterforce, and the distance from the center of rotation of the disk to the point where the force is measured, whereby to indicate torque. These may all be measured more or less directly or indirectly (such as strain as a function of force).

The invention need not measure the torque extremely accurately, and it should be understood that the measurement of torque herein is deemed to include a substantial measurement of the torque (that is, measuring approximately the torque), since what is of interest is how an engine behaves one day compared with the next, or what effect a particular change in engine adjustments has on the engine, and the like.

The invention may be utilized with conventional tachometers to provide torque versus speed measurements, at a variety of engine speeds. Multiple brakes may be used, if desired.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 5 is a partial, simplified side elevation view of another embodiment of a dynamometer according to the invention, utilizing a sliding brake support.

FIG. 6 is a partial, sectional view taken on the line 6—6 of FIG. 5.

FIG. 7 is a partial, simplified side elevation view of a dynamometer of the invention employing a flexure as a brake support, the counter force on the brake being measured by a strain gauge.

FIG. 8 is a partial sectional view taken on the line 8—8 of FIG. 7.

BEST MODE FOR CARRYING OUT THE INVENTION

Figure 1:
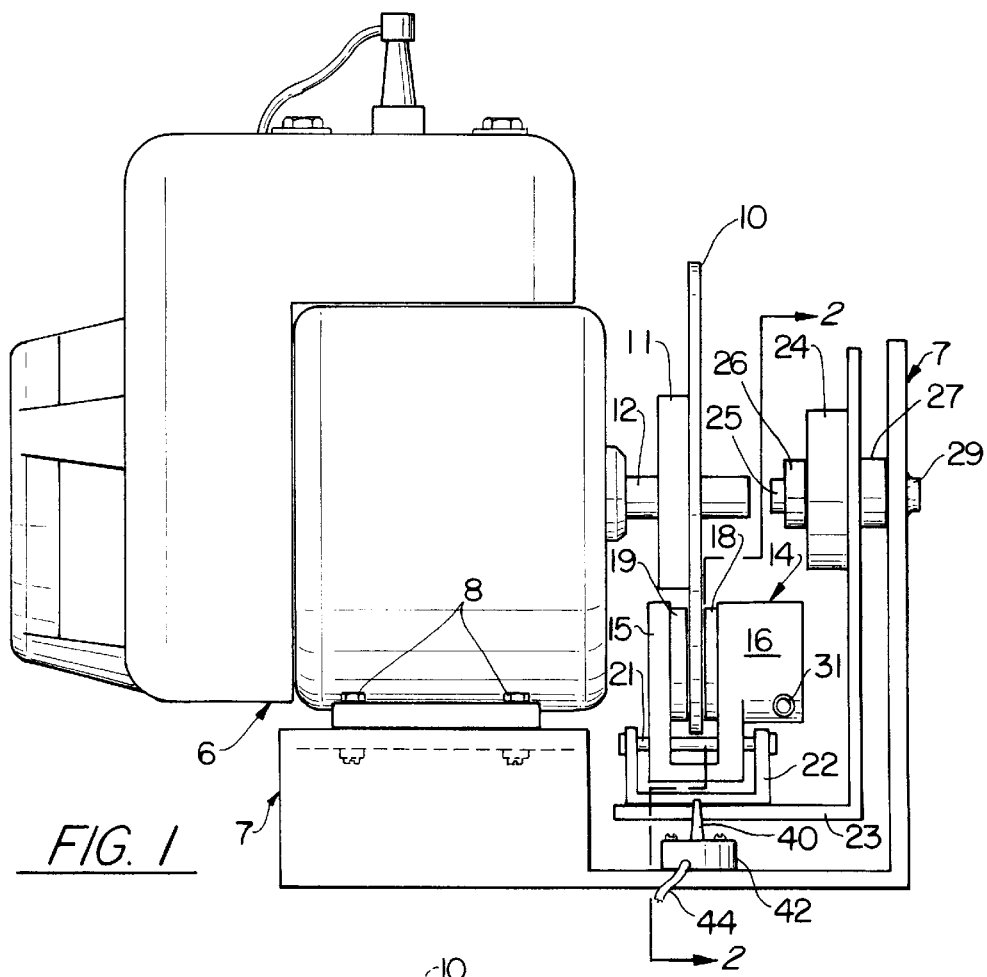
FIG. 1 is a simplified side elevation view of a small engine mounted on a dynamometer according to the present invention.
Figure 3:
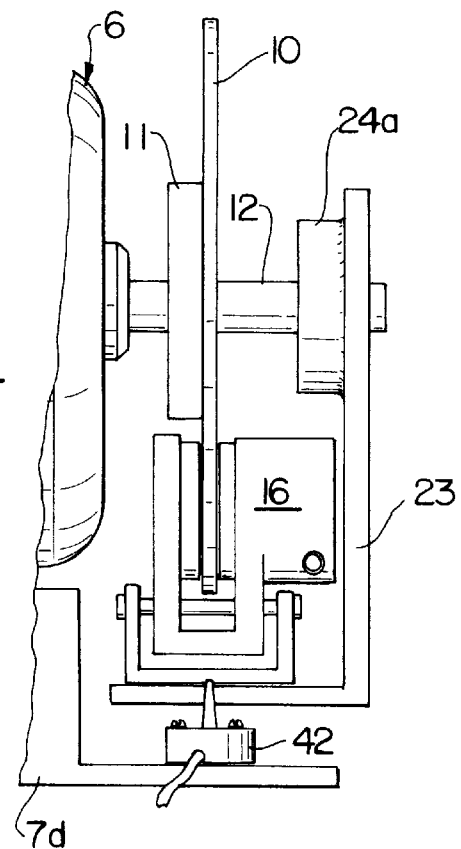
FIG. 3 is a partial side elevation view of an embodiment with a pendulum journaled directly to an engine shaft.

Referring to FIG. 1, a small engine 6 is mounted to a frame 7 of a dynamometer according to the invention in any suitable way, such as by bolts 8. A disk 10 has a flange 11 which is fastened to the driven shaft 12 of the engine 6. The disk 10 is loaded, with the engine running at any desired speed, by means of a disk brake 14, which in this embodiment comprises a conventional automotive disk brake having a caliper 15, a hydraulic cylinder 16 (sometimes referred to as a wheel cylinder), and a pair of friction pads 18, 19. With pressure applied to the pad 18 by the cylinder 16, the caliper 15 will slide on pins 21 drawing the pad 19 into engagement with the disk 10 until the pressure on the pads 18 and 19 is substantially equal, all as is conventional. The caliper 15 is supported on the pins 21 which in turn are fixed to a bracket 22 that is fastened in any suitable way (not shown) to a brake support, such as a pendulum 23. The pendulum 23 is fixed in any suitable way (not shown) to a bearing 24 which allows the pendulum to swing freely about a pivot shaft 25 that is coaxial with, but independent of, the driven shaft 12 of the engine. A suitable flange 26 may prevent the bearing 24 from moving outwardly on the shaft 25. Suitable slip washers or spacers, such as a spacer 27 may separate the pendulum 23 from the frame 7. The shaft 25 may be fixed to the frame 7 in any suitable way such as by means of a weldment 29. As shown in FIG. 3, the pendulum 23 may be journaled directly to the engine shaft 12 by a bearing 24a fastened to the pendulum 23, the driven shaft and the pivot shaft then being the same. Instead of the base-mounted force transducer, the pendulum may have a flexure fastened to it, the other end of the flexure being slidably fixed to the base, with a strain gauge on the flexure providing an indication of torque (a variant of FIGS. 5 and 6 hereinafter).

Figure 2:
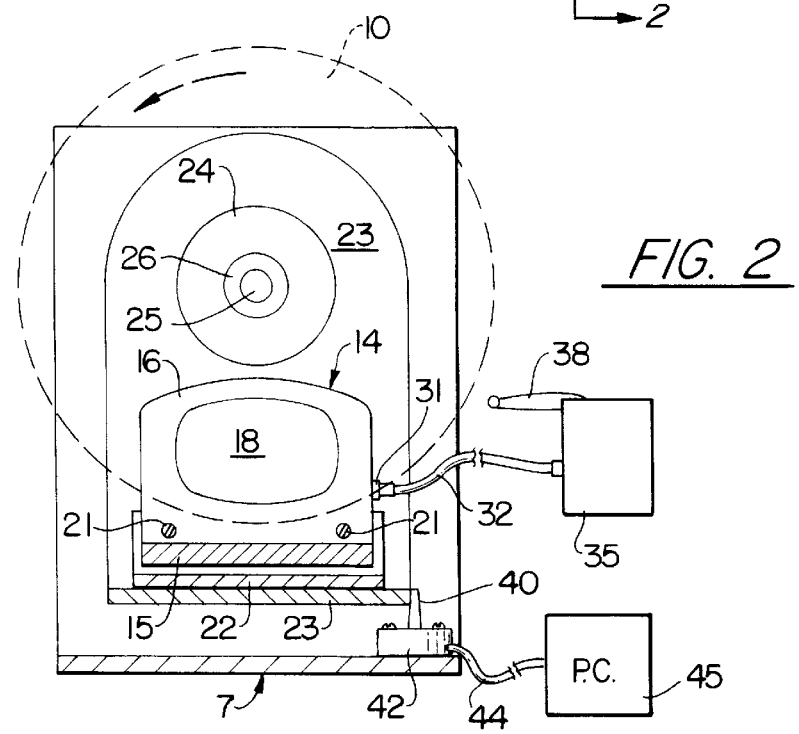
FIG. 2 is a sectioned, front elevation view taken on the line 2—2 of FIG. 1, utilizing an electronic force transducer.

As shown in FIG. 2, the hydraulic cylinder 1 6 of the disk brake 14 has a fitting 31 for connection to a hydraulic line 32 that provides pressurized fluid from a manual hydraulic pump 35. In FIG. 2, the disk 10 is superposed in phantom, for reference. Tangential force is applied to the disks 18, 19 as a result of hydraulic pressure being provided by movement of a lever 38 on the pump 35. Alternatively, the pump 35 and cylinder 16 may be pneumatic. Assuming that the disk 10 is moving counterclockwise as seen in FIG. 2, the tangential force will be to the right as seen in FIG. 2. The rightward tangential force on the brake pads 18, 19 will tend to rotate the pendulum 23 counterclockwise which in turn causes the base of the pendulum 23 to provide a rightward force against an input lever 40 of a force transducer 42. The transducer 42 will provide proportionate electrical signals over lines 44 to electronic processing means, such as a personal computer (PC) 45. The distance that the pendulum base 23 moves is minuscule, depending on the sensitivity of the transducer 42, and may be almost imperceptible. For a horizontal, tangential force, the centroids of the pads 18, 19 should be on a vertical radius of the disk. The torque is the force measured by the device 42 multiplied by the distance between the tangential line of application of force (such as the bottom of the pendulum 23) and the center of the shaft 25.

The simplicity of the invention is derived from the fact that the amount of force applied by the disk brake 14 to the disk 10 (the "squeeze" force) is important only insofar as it may alter the speed and loading at which a force measurement will be taken. The amount of force applied by the disk brake 14 is basically irrelevant to the torque calculation. Thus, all that is needed is the aforesaid distance (which is trivial) and the tangential counterforce measured by the transducer 42.

As an alternative to the embodiment of FIGS. 1 and 2, the pivot shaft 25 may be somewhat longer, and a shaft torsion strain gauge disposed on the shaft may provide an indication of force and/or torque. As another alternative, the pivot shaft 25 may be secured to a flexure instead of to the base, and the flexure secured to the base, and the strain may be measured in the flexure. Or, the flexure may be resiliently disposed to the base and its displacement calibrated in units of torque. Or, the flexure may be loaded with a weight, or a spring.

Figure 4:
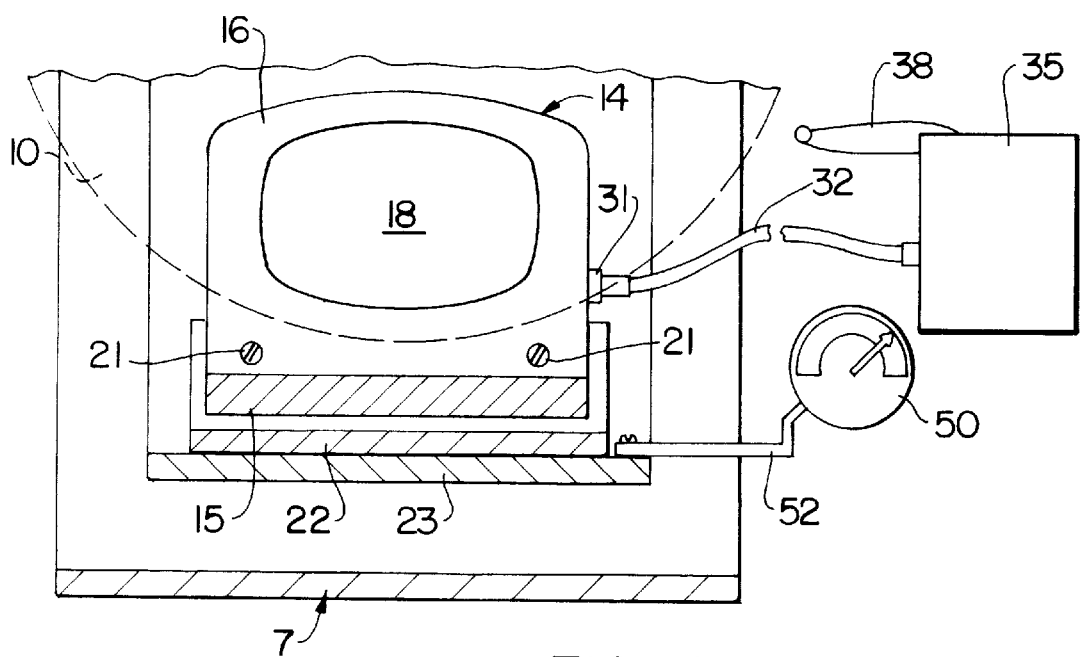
FIG. 4 is a partial, sectioned, front elevation view of a variant of the dynamometer shown in FIG. 2, utilizing a force gauge.

In an alternative embodiment of the invention shown in FIG. 4, instead of using an electronic force transducer 42 for use with electronic processing means such as a PC 45, the invention may use a regular, calibrated torque meter 50, the needle mechanism of which is connected by a linkage 52 to the pendulum 23. The torque meter 50 is a force meter in which the known distance to the application of force is taken into account when the scale on the escutcheon is prepared, so that it will read directly in torque.

Referring now to FIGS. 5 and 6, another embodiment of the invention eliminates the use of the pendulum 23 and instead mounts the disk brake 14 on a bracket 22a that can slide in a direction concentric with the disk 10. The bracket 22a has holes within two integral flanges 52 that allow it to slide on arcuate rods 53 that are supported by a bracket 54. The bracket 54, in turn, is fastened in any suitable way (not shown) to a frame 7a which is the same as the frame 7 in FIGS. 1 and 2, except that it is much shorter and has none of the assemblage relating to the pendulum 23. The force transducer 42 is mounted to the frame 7a in such a position that movement of the disk brake 14 as a result of the counterforce will cause the cylinder 16 to apply force to the input lever 40 of the transducer. In this embodiment, the brake support comprises the housing of the disk brake itself, including the cylinder 16.

A variation of the embodiment of FIGS. 5 and 6 may have the brackets 22a and 54 with mutually facing arcuate surfaces, with rollers in between them.

Referring to FIG. 7, in an additional embodiment of the invention a bracket 22b, which is similar to the bracket 22 of FIGS. 1 and 2 except that it has an extension providing a lip 55, is suspended by a flexure 56 from a lip 57 on a frame 7b which is similar to the frame 7 of FIGS. 1 and 2. The flexure 56 may be fastened to the lips 55, 57 in any suitable way such as with nuts 58. The rightward counterforce against the disk brake 14 caused by the application of braking force to the disk 10 will cause the rod 56 to bend. The extent of bending of the rod 56 may be measured with a strain gauge 59, which is connected to any suitable signal processing system in a conventional way, or the deflection of either the lower end of the flexure 56 or the frame 22b may be measured with any suitable, conventional distance measuring device. The flexure 56 will bend concave open in a direction substantially parallel to the counterforce applied to the disk brake as a result of the braking action applied by the disk brake to the disk.

As an alternative, the flexure member may be mounted below the frame 22b instead of above it. Or, the flexure may be horizontal, parallel with the engine shaft 12, and directly supporting the brake support 22.

Although forming no part of the invention, speed of the engine may be measured in any conventional way, such as with a tachometer, which may be used with the embodiment of FIG. 4, or a proximity sensor which provides a voltage indicative of the speed at which some sensible element, such as a bolt, or a notch in the disk 10, passes the proximity sensor; such voltage might be utilized in the same electronic processing means, such as the PC 45 of FIG. 2. and used to generate torque versus speed plots and tables in a conventional way.

Because torque may be read directly (as in shaft torsion strain gauges) or by relating it (trivially) to measured force, the term "resistance" is used herein to include either or both torque and force.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A dynamometer for a rotary engine driving a driven shaft, comprising:
    (a) a disk to be attached to said driven shaft for rotation with said driven shaft;
    (b) a disk brake for applying force to said disk;
    (c) a pendulum journaled to rotate freely about a pivot shaft coaxial with the axis of rotation of said driven shaft, said disk brake being disposed on said pendulum so that resistance applied to said disk by said disk brake provides a counterresistance to said disk brake and said pendulum which is substantially tangential to any circle concentric with said disk; and
    (d) a transducer for measuring a function of said tangential counterresistance imparted to said pendulum.

2. A dynamometer according to claim 1 wherein said element (d) comprises a force meter mechanically connected to said brake support.

3. A dynamometer according to claim 1 wherein said pivot shaft comprises said driven shaft.

4. A dynamometer according to claim 1 wherein said pivot shaft comprises a shaft coaxial with, but independent of, said drives shaft.

5. A dynamometer according to claim 1 wherein said element (d) provides electrical signals proportional to force.

6. A dynamometer according to claim 1 wherein said element (d) comprises a torque meter mechanically connected to said brake support.

7. A dynamometer according to claim 2 wherein said force meter is calibrated in units of torque.

8. A dynamometer for a rotary engine driving a shaft, comprising:
    (a) a disk to be attached to said shaft for rotation with said shaft;
    (b) a disk brake for applying force to said disk;
    (c) a flexure member for supporting said disk brake so that resistance applied to said disk by said disk brake provides a counterresistance to said disk brake and said flexure member which is substantially tangential to any circle concentric with said disk, said flexure member bending in response to said counterresistance; and
    (d) means responsive to bending of said flexure member for measuring said counterresistance.

9. A dynamometer according to claim 8 wherein said element (d) comprises a strain gauge disposed on said flexure member.

10. A dynamometer according to claim 1 wherein said disk brake comprises a hydraulically or pneumatically actuated brake.

11. A dynamometer according to claim 1 wherein said disk brake comprises a caliper or clamp brake.

* * * * *